(12) United States Patent
Kilday et al.

(10) Patent No.: US 7,970,743 B1
(45) Date of Patent: Jun. 28, 2011

(54) RETENTION AND DISPOSITION OF STORED CONTENT ASSOCIATED WITH MULTIPLE STORED OBJECTS

(75) Inventors: Roger W. Kilday, Livermore, CA (US); John David Dorman, Gloucester (CA); David Humby, Richmond (CA); Fiona Schrader, Ottawa (CA); Dan Bailey, Kanata (CA)

(73) Assignee: EMC Corporation, Hopkinton, MA (US)

( * ) Notice: Subject to any disclaimer, the term of this patent is extended or adjusted under 35 U.S.C. 154(b) by 62 days.

(21) Appl. No.: 11/371,147

(22) Filed: Mar. 7, 2006

Related U.S. Application Data

(60) Provisional application No. 60/718,159, filed on Sep. 15, 2005.

(51) Int. Cl.
G06F 7/00 (2006.01)
G06F 17/00 (2006.01)
(52) U.S. Cl. .................. 707/689; 707/692; 707/694
(58) Field of Classification Search .................. 707/100, 707/694, 689, 692
See application file for complete search history.

(56) References Cited

U.S. PATENT DOCUMENTS

| | | | |
|---|---|---|---|
| 5,583,983 A | 12/1996 | Schmitter | |
| 6,128,661 A | 10/2000 | Flanagin et al. | |
| 6,430,666 B1 * | 8/2002 | Roth | 711/202 |
| 6,505,212 B2 | 1/2003 | Nakano et al. | |
| 6,553,365 B1 | 4/2003 | Summerlin et al. | |
| 6,609,138 B1 | 8/2003 | Merriam | |
| 6,915,435 B1 * | 7/2005 | Merriam | 726/5 |
| 7,003,551 B2 * | 2/2006 | Malik | 709/206 |
| 7,027,463 B2 | 4/2006 | Mathew et al. | |
| 7,107,298 B2 * | 9/2006 | Prahlad et al. | 707/204 |
| 7,107,416 B2 * | 9/2006 | Stuart et al. | 711/159 |
| 7,117,322 B2 * | 10/2006 | Hochberg et al. | 711/160 |
| 7,146,388 B2 | 12/2006 | Stakutis et al. | |
| 7,149,738 B2 * | 12/2006 | Kumar et al. | 707/9 |
| 7,155,466 B2 | 12/2006 | Rodriguez et al. | |
| 7,159,074 B2 | 1/2007 | Kihara et al. | |
| 7,171,433 B2 * | 1/2007 | Wolfe et al. | 707/203 |
| 7,233,959 B2 | 6/2007 | Kanellos et al. | |
| 7,293,027 B2 | 11/2007 | Margolus | |
| 7,318,072 B2 | 1/2008 | Margolus et al. | |
| 7,392,234 B2 | 6/2008 | Shaath et al. | |
| 7,426,541 B2 | 9/2008 | McCown | |
| 7,493,350 B2 | 2/2009 | Episale et al. | |
| 7,533,133 B1 | 5/2009 | Lanzatella et al. | |
| 7,680,830 B1 | 3/2010 | Ohr et al. | |
| 7,689,602 B1 | 3/2010 | Sim-Tang | |
| 2002/0120612 A1 | 8/2002 | Ichihara | |

(Continued)

OTHER PUBLICATIONS

Cohasset Associates, Inc., Compliance Requirements Assessment, Oct. 2004, White Paper, pp. 1-54.

(Continued)

*Primary Examiner* — James Trujillo
*Assistant Examiner* — Jeffrey Burke
(74) *Attorney, Agent, or Firm* — Van Pelt, Yi & James LLP

(57) ABSTRACT

Retention and disposition of stored content associated with multiple stored objects is disclosed. An indication is received that a first stored object associated with an item of content comprising a body of managed content is no longer subject to retention under a retention policy applicable to the first stored object. The item of content is deleted or otherwise disposed of only if the item of content is not associated with a second stored object that is still required or desired to be retained.

12 Claims, 18 Drawing Sheets

U.S. PATENT DOCUMENTS

| | | | |
|---|---|---|---|
| 2002/0174139 | A1 | 11/2002 | Midgley et al. |
| 2003/0088591 | A1 | 5/2003 | Fish |
| 2003/0090531 | A1 | 5/2003 | Wong et al. |
| 2003/0208608 | A1 | 11/2003 | Merriam |
| 2003/0225801 | A1 | 12/2003 | Devarakonda et al. |
| 2003/0236788 | A1* | 12/2003 | Kanellos et al. ............ 707/100 |
| 2004/0019614 | A1 | 1/2004 | Wang |
| 2004/0167943 | A1 | 8/2004 | Margolus |
| 2004/0193740 | A1 | 9/2004 | Kasmirsky et al. |
| 2005/0076066 | A1 | 4/2005 | Stakutis et al. |
| 2005/0132010 | A1 | 6/2005 | Muller |
| 2005/0165734 | A1 | 7/2005 | Vicars et al. |
| 2005/0192830 | A1 | 9/2005 | Pugh et al. |
| 2005/0193043 | A1 | 9/2005 | Hoover |
| 2005/0216745 | A1* | 9/2005 | Speare et al. ................ 713/182 |
| 2005/0235010 | A1 | 10/2005 | Bates et al. |
| 2005/0273858 | A1 | 12/2005 | Zadok et al. |
| 2005/0283461 | A1* | 12/2005 | Sell et al. ........................... 707/1 |
| 2006/0004689 | A1* | 1/2006 | Chandrasekaran et al. ...... 707/1 |
| 2006/0010301 | A1 | 1/2006 | Yagawa |
| 2006/0026220 | A1 | 2/2006 | Margolus |
| 2006/0031351 | A1* | 2/2006 | Marston et al. ............... 709/206 |
| 2006/0089938 | A1 | 4/2006 | Leonard et al. |
| 2006/0101384 | A1 | 5/2006 | Sim-Tang et al. |
| 2006/0149735 | A1 | 7/2006 | DeBie et al. |
| 2006/0156382 | A1 | 7/2006 | Motoyama |
| 2006/0224626 | A1* | 10/2006 | Lakshminath et al. .... 707/104.1 |
| 2006/0230044 | A1 | 10/2006 | Utiger |
| 2006/0259468 | A1* | 11/2006 | Brooks et al. ..................... 707/3 |
| 2007/0033200 | A1 | 2/2007 | Gillespie |
| 2007/0088715 | A1 | 4/2007 | Slackman et al. |
| 2007/0094311 | A1* | 4/2007 | Pelletier et al. ............... 707/204 |
| 2007/0150445 | A1 | 6/2007 | DeBie |
| 2007/0162467 | A1* | 7/2007 | Wolber et al. ................. 707/100 |
| 2007/0185914 | A1 | 8/2007 | Prahlad et al. |

OTHER PUBLICATIONS

Wel-Dong Zhu, E-mail Archiving and Records Management Integration Solution Guide, Jan. 2006, IBM, 5$^{th}$ Edition.

U.S. Appl. No. 11/370,604, Kilday et al.

U.S. Appl. No. 11/370,421, Kilday et al.

U.S. Appl. No. 11/371,147, Kilday et al.

* cited by examiner

RETENTION AND DISPOSITION OF STORED CONTENT ASSOCIATED WITH MULTIPLE STORED OBJECTS

CROSS REFERENCE TO OTHER APPLICATIONS

This application claims priority to U.S. Provisional Patent Application No. 60/718,159 entitled AVOIDING DUPLICATIVE STORAGE OF MANAGED CONTENT filed Sep. 15, 2005, which is incorporated herein by reference for all purposes.

BACKGROUND OF THE INVENTION

An enterprise may have a legal or other obligation and/or an internal policy that requires selected content to be retained in a particular manner and/or for a prescribed period. In some cases, it may be necessary to be able to provide proof that content data, such as files, email messages, or other content, is being and/or has been retained as required. Often an enterprise will have a policy that at least certain data not be retained beyond an associated and/or prescribed retention period, to avoid the cost of storing and managing the data and the potential cost of locating and producing the data in the context of litigation, for example.

In some managed content systems, some stored content, e.g., certain files, mail messages, or other content items, may be associated with two or more stored objects. For example, in some systems to avoid duplication the content of a file is stored only once, even if the file later is sent as an attachment to an email message or incorporated into another document/object. In some such cases, the content is stored only once and is linked to two or more documents/objects. In such cases, there is a need for a way to ensure that content is not deleted until the last retention period applicable to the content has expired.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Retention and disposition of stored content associated with multiple stored objects is disclosed. An indication is received that a first stored object associated with an item of content comprising a body of managed content is no longer subject to retention under a retention policy applicable to the first stored object. The item of content is deleted or otherwise disposed of only if the item of content is not associated with a second stored object that is still required or desired to be retained.

Figure 1:
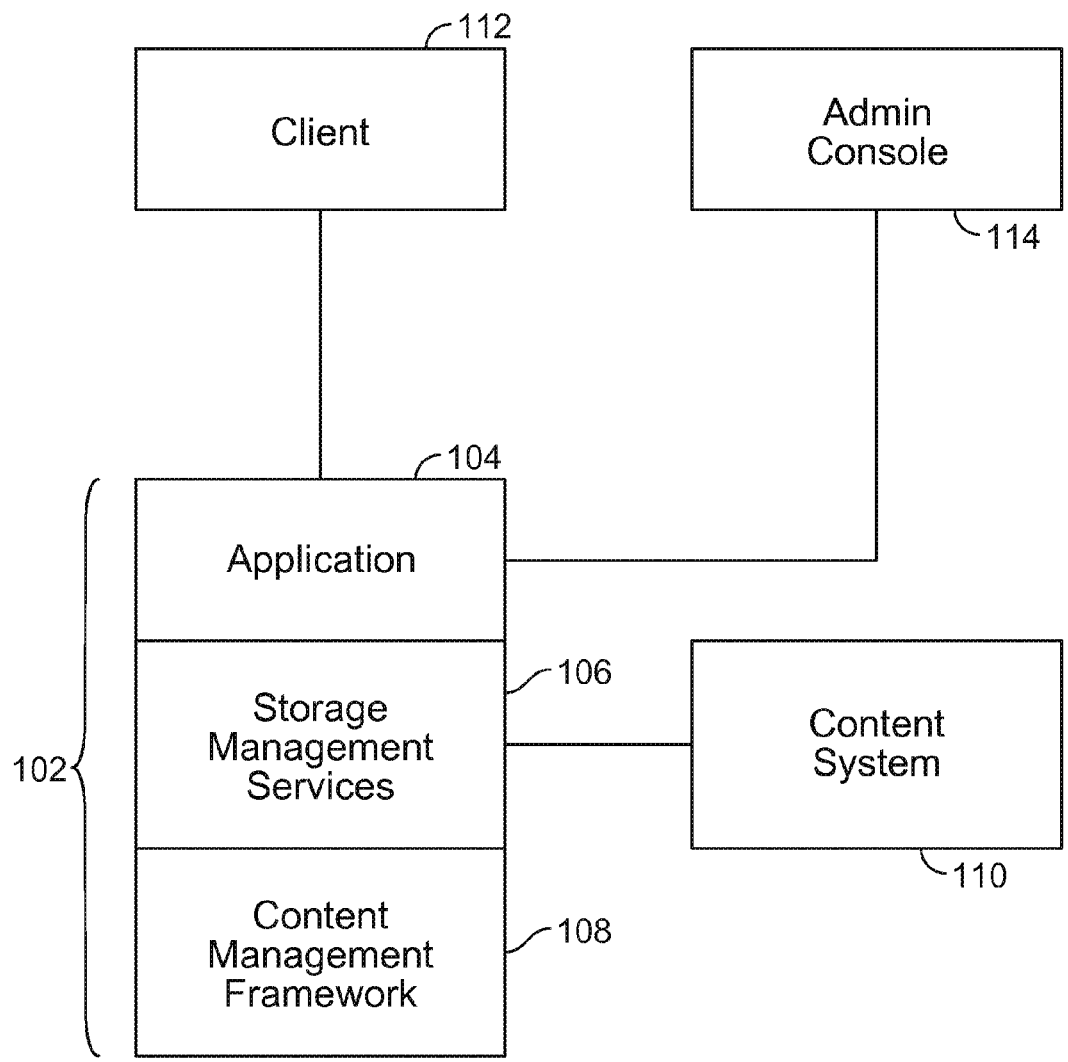
FIG. 1 is a block diagram illustrating an embodiment of a content management system.

FIG. 1 is a block diagram illustrating an embodiment of a content management system. In the example shown, content management system 102 includes an application 104 configured to interact with and use storage management services 106 running on a content management framework 108 to manage one or more content items stored on content system 110. In some embodiments, the content management system 102 and content system 110 comprise a single physical system. In various embodiments, the content manage system 102, the content system 110, or both is/are implemented using two or more physical systems. In some embodiments, content management framework 108 includes a set of foundation classes of objects used to represent and provide content management services with respect to items of content stored on content system 110. In various embodiments, storage management services 106 includes business logic, implemented at least in part in some embodiments as a business object framework, including logic and/or methods that instantiate, populate, and otherwise use objects associated with the content management framework. In some embodiments, application 104 interacts with the storage management services 106 via a published or other API ingest and store items of content in content system 110 and to provide managed access to and control over items of content stored in content system 110. In the example shown, a client 112 is configured to access application 104, e.g., via a network, to create and/or otherwise provide new content to be managed by content management system 102; search for, retrieve, or otherwise access content managed by and/or otherwise associated with content management system 102; and/or obtain other content management related services with respect to content managed by content management system 102. An admin console 114 provides an administrator with access to content management system 102 to configure and/or otherwise control content management system 102. In some embodiments, content management system 102 is configured to perform retention management services with respect to content managed by content management system 102, such as by ensuring the content required to be retained is not changed or deleted during an applicable retention period; promoting and qualifying content for one or more levels of disposition prescribed by an applicable retention policy; providing notifications and reports regarding content retention; providing for final disposition in accordance with a retention policy; and placing a "hold" on content, ensuring it is retained in its current and/or in a prescribed location during a hold period, e.g., during the pendency of an investigation and/or litigation to which the content is determined to be and/or identified as being actually or potentially relevant. In various embodiments, administration console 114 provides to an administration an interface that enables the administrator to do one or more of the following: upload and/or define one or more retention policies, associate a retention policy with specified content and/or a designated physical and/or logical storage location, request and/or receive reports and/or notifications regarding retention, place holds on designated content and/or storage areas, etc.

Figure 2:
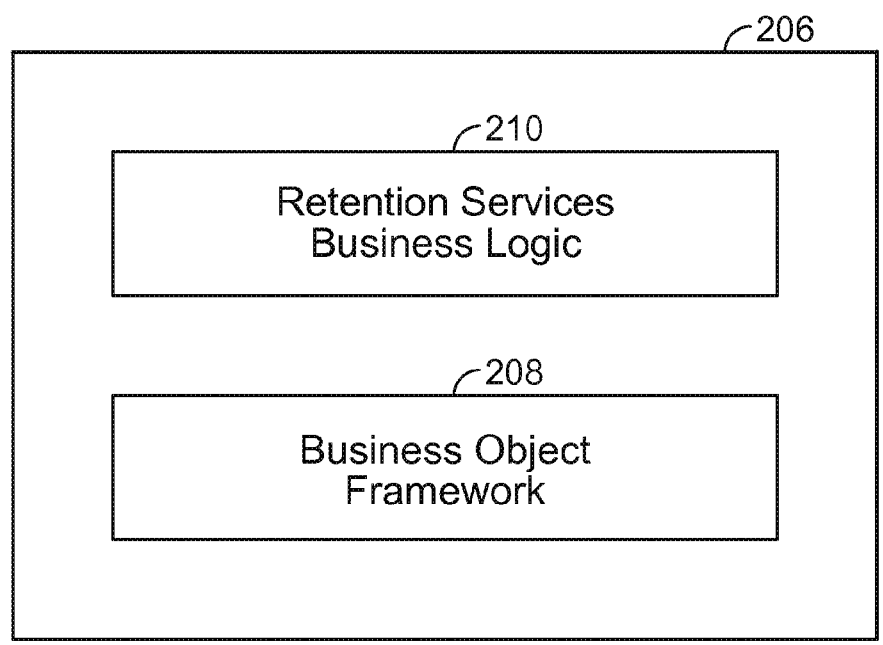
FIG. 2 is a block diagram illustrating an embodiment of a storage management services component or module of a content management system.

FIG. 2 is a block diagram illustrating an embodiment of a storage management services component or module of a content management system. In the example shown, storage management services component 206 includes a business object framework 208 used by retention services business logic 210 to provide one or more retention-related services with respect to managed content. In some embodiments, retention services business logic 210 includes one or more methods that instantiate and configure objects associated with business object framework 208 as required to perform retention-related services with respect to managed content. In some embodiments, the storage management services component 206 includes additional business logic, not shown in FIG. 2, configured to use business object framework 208 to provide other content management services and/or functionality with respect to managed content.

Figure 3:
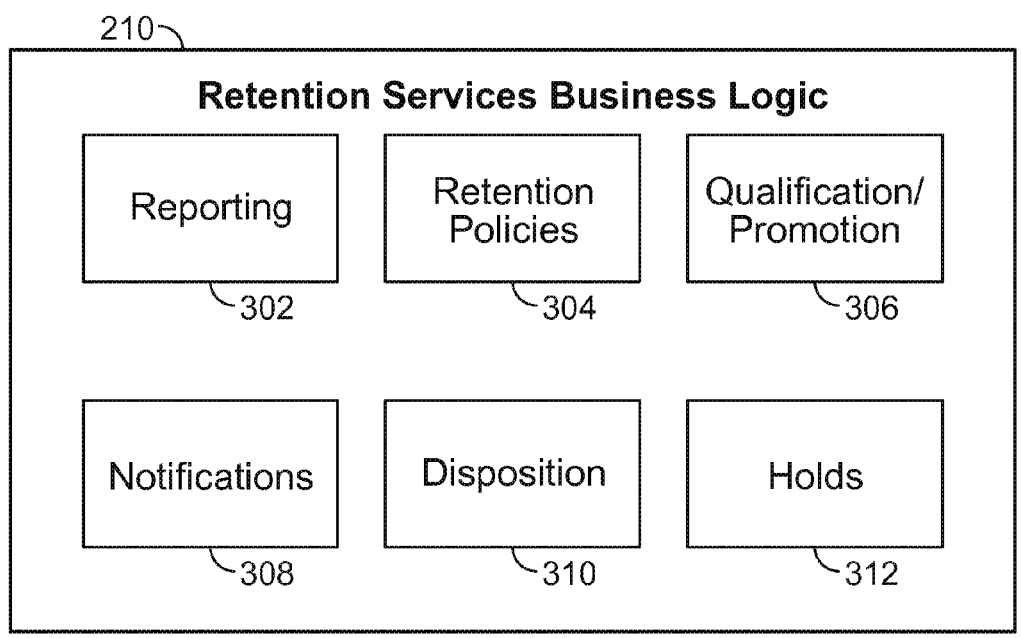
FIG. 3 is a block diagram illustrating an embodiment of retention services business logic.

FIG. 3 is a block diagram illustrating an embodiment of retention services business logic. In the example shown, retention services business logic 210 of FIG. 2 includes reporting logic 302, retention policy logic 304, qualification and promotion logic 306, notifications logic 308, disposition logic 310, and hold logic 312. Reporting logic 302 generates one or more reports, on a periodic and/or as requested basis, containing retention-related information, including for example the disposition/status of content included in the report, an identification of content qualified and/or promoted for disposition during a period with which the report is associated, etc. Retention policy logic 304 includes one or more methods for defining retention policies, associating a retention policy with specific items of content, implementing and/or enforcing with respect to an item of content a retention policy associated with the content, restoring, configuring, and/or modifying a retention policy, and/or resolving conflicts, if any, in cases in which two or more retention policies and/or rules apply to an item of content and/or a physical/logical storage area. Qualification and promotion logic 306 includes logic for tracking and advancing items of content through one or more phases of retention and/or disposition defined by and/or otherwise associated with an application retention policy and/or its implementation and/or enforcement. In addition, qualification and promotion logic 306 includes logic for obtaining permissions and/or otherwise qualifying items of content for advancement to a next phase of retention and/or disposition. Notifications logic 308 includes logic configured to generate and transmit one or more retention-related notifications, if applicable, such as by notifying a responsible administrator and/or manager and/or content owner that an item of content previously under retention and subsequently qualified for deletion and/or other final disposition, and/or associated metadata, has been deleted and/or otherwise disposed of, as applicable, in accordance with an applicable retention policy. Disposition logic 310 includes logic for disposing of items of content in accordance with an applicable retention policy, e.g., by moving an item from near-line to offline and/or offset storage, scheduling content for deletion and/or other disposition, and actually deleting or otherwise finally disposing of content, as required by an applicable retention policy, e.g., at the end of an applicable retention period. Hold logic 312 includes logic to prevent an item of content that is required to be held potentially beyond an otherwise applicable retention period from being deleted and/or otherwise disposed of even at the end of such an applicable retention period. In various embodiments, hold logic 312 prevents content under hold and/or associated metadata from being accessed, viewed, moved, deleted, and/or changed at a time when the content is in a "hold" status.

Figure 4:
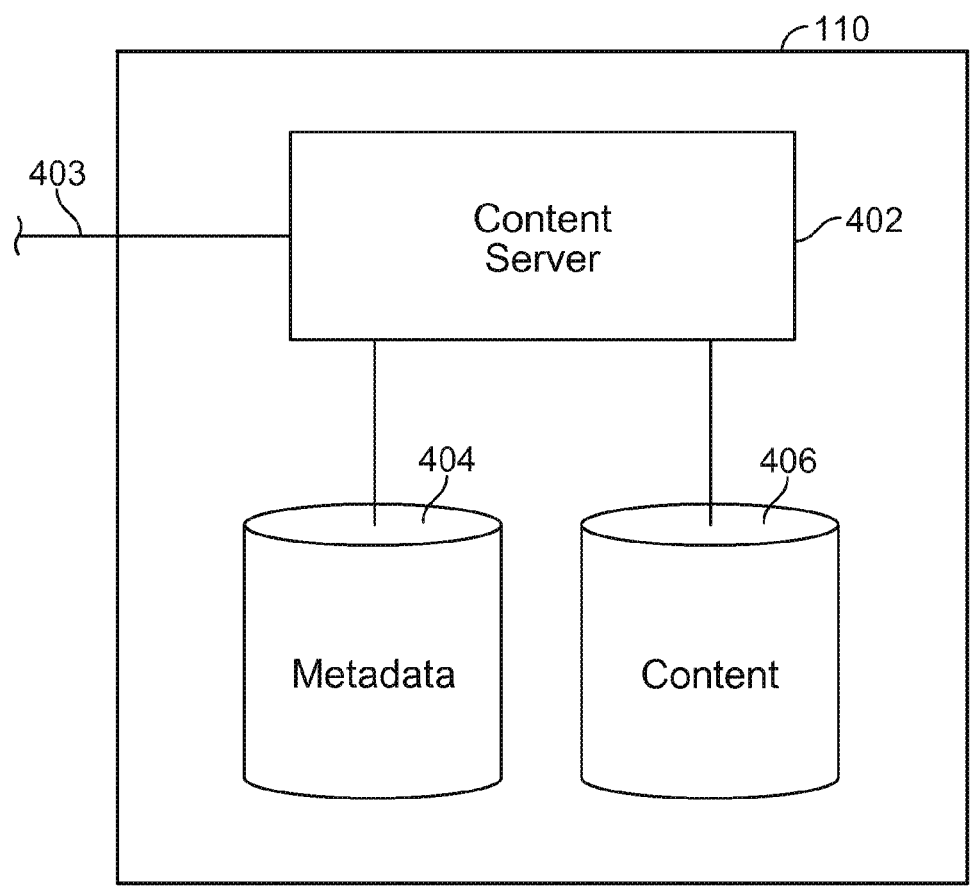
FIG. 4 is a block diagram illustrating an embodiment of a content system.

FIG. 4 is a block diagram illustrating an embodiment of a content system. In the example shown, content system 110 includes a content server 402 configured to send/receive content via a communication interface 403, such as a network interface. In some embodiments, the content server 402 is connected via interface 403 to a content management system such as content management system 102 of FIG. 1. The content server 402 provides access to content associated with and/or stores new content in a content store 406. In some embodiments, the content store 406 includes a content addressed storage and/or other external content storage system, such as an EMC Centera™ system available commercially from EMC Corporation. The content server 402 stores in and/or access from a metadata store 404 metadata derived from and/or otherwise associated with items of content stored in content store 406. In some embodiments, metadata store 404 includes one or more database applications and/or systems, such as an Oracle™ database. In various embodiments, the metadata stored in metadata store 404 includes one or more document and/or content objects representing and/or otherwise associated with items of managed content stored in content store 406, one or more full text indexes and/or associated entries associated with content stored in content store 406, and/or one or more objects configured to implement at least in part a retention policy applicable to one or more associated items of content in content store 406. In various embodiments metadata stored in metadata store 404 is used to track and/or provide access to successive versions of an item of content, such as a file or other item of content and/or to provide other content management functionality.

Figure 5A:
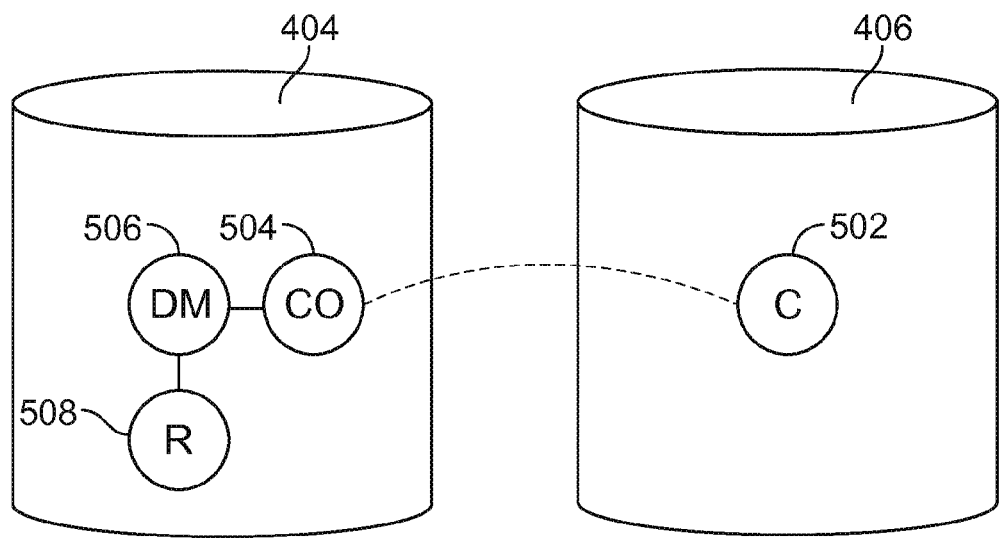
FIG. 5A is a block diagram of an embodiment of a metadata store and content store illustrating an item of content and associated metadata.

FIG. 5A is a block diagram of an embodiment of a metadata store and content store illustrating an item of content and associated metadata. In the example shown, content item 502, e.g., a file or other file system object, database table or file, etc., stored in content store 406 is represented in metadata store 404 by a content object 504 used to track, access, save, and perform other operations with respect to content item 502 and a document object 506, linked to content object 504, the document object being configured to store descriptive and other metadata derived from and/or otherwise associated with content item 502. A retainer object 508 linked to document object 506 is configured to invoke one or more retention policy services provided by a content management system and/or framework with which the content item 502 and associated metadata are associated to enforce a retention policy and/or perform a retention-related operation and/or function with respect to content item 502 and/or associated metadata. In the example shown, the retainer object 508 is linked to the single document object 506 shown. In some embodiments, the same retainer object 508 may be shared by two or more document objects and/or associated content items and/or metadata, e.g., by linking the same retainer object 508 to two or more document objects. While a separate document object 506 and content object 504 are shown in this example, in some embodiments a single metadata object is used to represent content item 502.

Figure 5B:
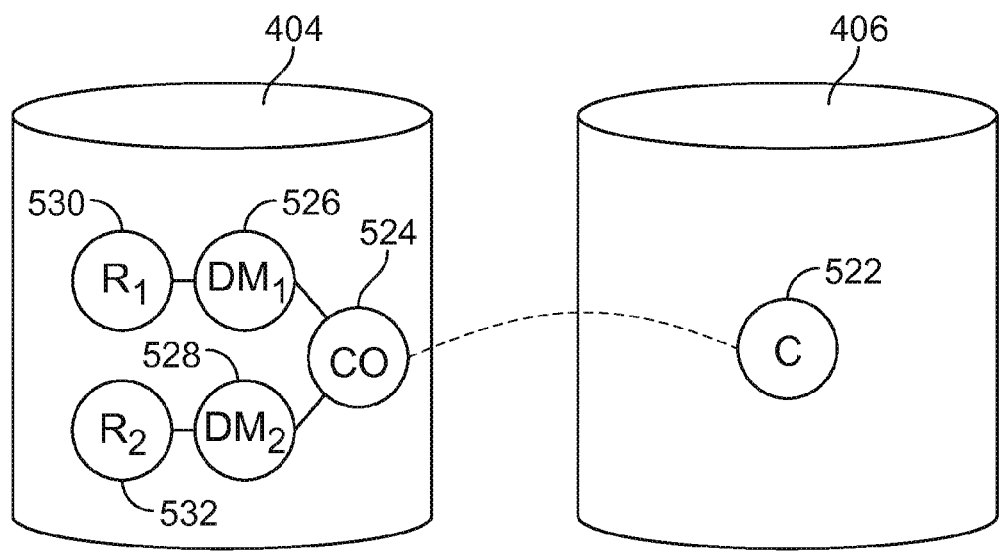
FIG. 5B is a block diagram of an embodiment of a metadata store and content store illustrating an item of content and associated metadata.

FIG. 5B is a block diagram of an embodiment of a metadata store and content store illustrating an item of content and associated metadata. In the example shown, a content item 522 in content store 406 is represented in metadata stored in metadata store 404 by a content object 524. In this example, the same content item 522 is associated with two documents represented in metadata store 404 by a first document object 526 and a second document object 528, each of which is linked to a single content object 524 associated with content item 522. An example of where two or more document objects may link to a single content object is where an item of content exists as a file or other content item in content store 406 and is later attached and/or otherwise incorporate into another document, such as by attaching it to an email message or importing or otherwise incorporating it wholly into a subsequent word processing or other document. In the example shown, a first retainer object 530 is linked to first document object 526 and a second retainer object 532 is linked to second document object 528. In various embodiments, a different retention period or other parameter or rule may apply to the content item 522 based on its association with a first instance or occurrence of the content item 522 as represented by its association with first document object 526 than that applicable to content item 522 by virtue of its association with second document object 528. For example, if the retention period for the respective documents represented by document objects 526 and 528 were determined based on their date of creation, the retention period for the content item 522 would be different for the later-created instances than for the earlier instance. In some contexts, the length of the retention period and/or other retention parameters and/or processing may vary depending on such factors as who created the subsequent instance of a content item, what other content was included in the document with which the subsequent instance, etc. In some embodiments, as described more fully below, retention policy services associated with a content management system with which the content item 522 is associated are invoked by retainer objects 530 and 532, respectively, each to perform the retention functions (e.g., enforce the retention policy) it is configured to perform.

In some embodiments, a link count associated with content object 524 is decremented each time a requirement to retain associated content item 522 is removed, e.g., due to the expiration of a retention period for an instance/occurrence of content item 522, and the content object 524 and content item 522 are prevented from being deleted until the link count has been decremented to zero. In some embodiments, a document represented in metadata store 404 by a document object may have more than one retainer linked to it, e.g., one by virtue of the nature of the document and/or a logical storage location in which it is stored and a second by virtue of the author, subject matter, and/or some other attribute of the content, and in some such embodiments a link count on the document object is used to ensure the document object and associated any associated content item(s) and associated metadata are not deleted until required and/or permitted by a last remaining retainer (i.e., the link count has been decremented to zero).

In some embodiments, an associated content management system includes retention policy services and/or logic to resolve conflicts between two or more retention policies and/or objects associated with an item of content, e.g., to ensure that content required to be subject to continued retention by one retention policy is not deleted and/or otherwise disposed of prematurely based on another applicable retention policy, e.g., upon expiration of a retention period associated with the other policy. In some embodiments, as described more fully below, conflicts between two or more applicable retention policies are resolved prior to the conflict manifesting itself, e.g., by merging the requirements of two or more policies by resolving conflicts at or near the time when a second, third, etc. retention policy is made applicable to an item of content. In some embodiments a merged single policy that is free of conflicts is generated and made applicable to the content, e.g., by resolving conflicts in accordance with preconfigured and/or dynamically determined user preferences.

Figure 5C:
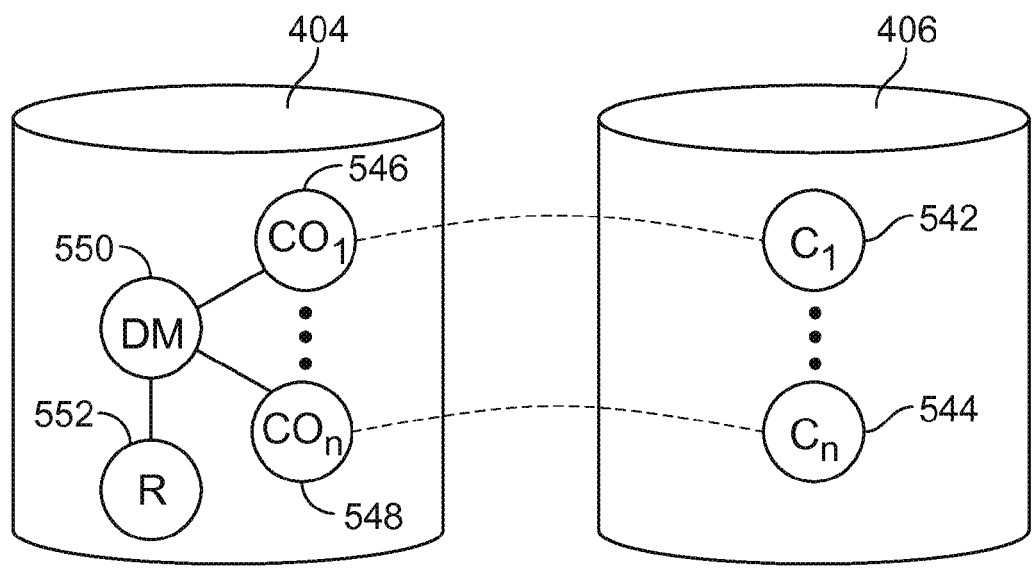
FIG. 5C is a block diagram of an embodiment of a metadata store and content store illustrating items of content and associated metadata.

FIG. 5C is a block diagram of an embodiment of a metadata store and content store illustrating items of content and associated metadata. In the example shown, each of a plurality of items of content associated with a document or file, represented in FIG. 5C by content items 542 and 544, is represented in metadata store 404 by a corresponding content object, represented in FIG. 5C by content objects 546 and 548. Each of the content objects 546-548 is linked to a document object 550 that represents the document in the metadata. In some embodiments, a configuration such as that shown in FIG. 5C is used to represent in metadata using a single document object a plurality of related content items, such as where multiple renditions of a file (e.g., text, pdf, html, other) are stored and/or where a document and/or a rendition thereof is stored as multiple files, such as by storing each page of a document as a separate tiff image. In the example shown, a retainer object 552 linked to document object 550 governs and provides retention for the content items 542-544 and associated metadata.

In some embodiments, if a new version of an existing document is saved and the new version specifies new or different content, the new version is stored by creating a new instance of the document object, with its own associated content object(s) and content item(s), e.g., as a separate instance of the set of objects shown in FIG. 5A. If the new version does not specify new or different content, in some embodiments, the new version shares the same content object(s) and content item(s) as the prior version, e.g., as shown in FIG. 5B.

Figure 5D:
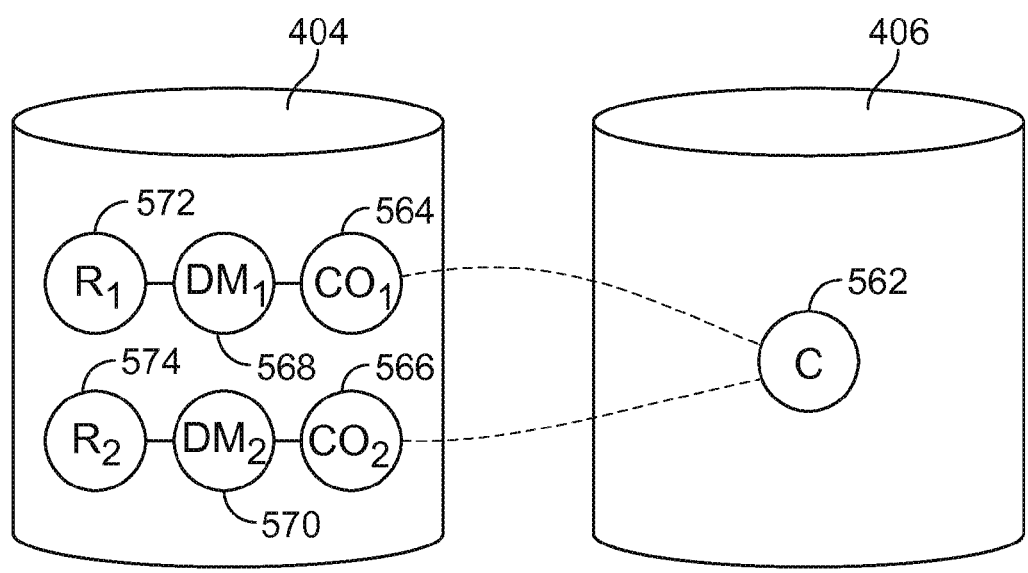
FIG. 5D is a block diagram of an embodiment of a metadata store and content store illustrating an item of content and associated metadata.

FIG. 5D is a block diagram of an embodiment of a metadata store and content store illustrating an item of content and associated metadata. In this example, a single content item 562 is represented in metadata 404 by two separate content objects 564 and 566, respectively. Content object 564 is associated with a first document object 568 and content object 566 is associated with a second document object 570. A first retainer object 572 is linked to first document object 568 and a second retainer object 574 is linked to second document object 570. Each of retainer objects 572 and 574 governs and provides retention for the instance/occurrence of content item 562 in the document with which it is associated and associated metadata. In the example shown, the content data for content item 562 is stored just once in content store 406, which conserves physical storage space in content store 406 by avoiding duplicate storage of content associated with two or more documents. In some embodiments, retention policy services and/or logic ensures that the content item 562 is retained as required by the respective retention policies associated with retainer objects 572 and 574, and that metadata associated with a particular instance/occurrence of content item 562 is removed and/or otherwise disposed of as the retention period/requirements associated with that instance/occurrence expire.

In various embodiments, a retainer object such as those shown in FIGS. 5A-5D includes data and/or methods comprising, associated with, and/or configured to implement/enforce an associated retention policy. The retainer object in some embodiments perform retention functions at least in part by invoking retention policy services and/or logic provided by a content management system, application, and/or framework with which it is associated. In some embodiments, the retainer object and/or associated retention policy services and/or logic may instantiate one or more other retention-related objects, e.g., an object configured to define and implement a business process to promote and qualify associated content and metadata through one or more stages or phases of retention (e.g., near-line storage, to offline storage, to offset storage, to final and verified deletion). In some embodiments, the retainer object itself handles promotion, qualification, and disposition.

Figure 6:
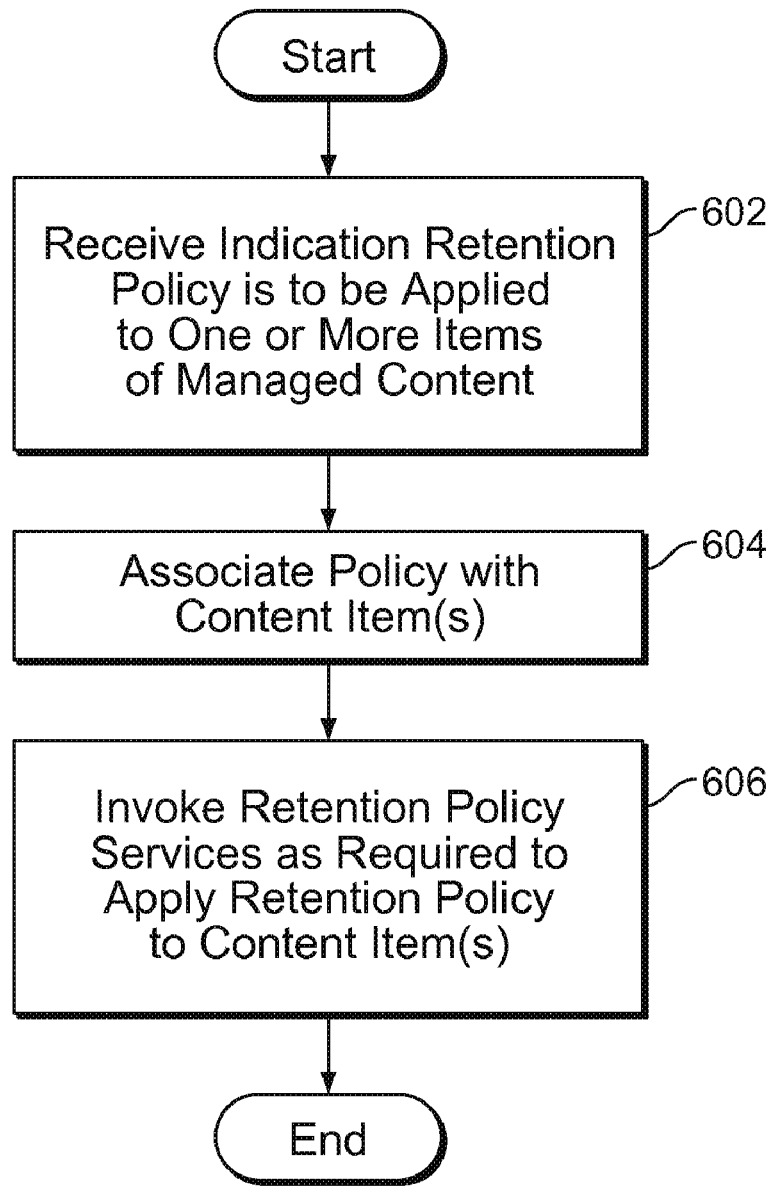
FIG. 6 is a flow chart illustrating an embodiment of a process for providing retention services for managed content.

FIG. 6 is a flow chart illustrating an embodiment of a process for providing retention services for managed content. In various embodiments, the process of FIG. 6 is implemented on a content management system, such as content management system 102 of FIG. 1, and/or a content system such as content system 110 of FIG. 1. At 602, an indication that a retention policy is to be applied to one or more items of managed content is received. In some embodiments, one or more retention policies may be applied selectively to selected items of managed content, e.g., particular files or other file system objects, database files and/or tables, etc. In various embodiments, the indication received at 602 includes receiving an indication that the one or more items have been linked to and/or stored in a logical and/or physical storage location with which a retention policy to be applied to the objects is associated. In various embodiments, the content items to which a retention policy is to be applied are determined through user interaction and/or at least in part automatically, e.g., by applying a preconfigured, and/or configurable, and/or dynamically determined filter, rule, or criterion to one or more items of content to determine which of them is to be governed by the retention policy. At 604, the applicable retention policy is associated with each item of content identified in and/or otherwise associated with the indication received at 602. In some embodiments, each content item comprising a body of managed content may have zero, one, or multiple retention policies and/or periods associated with it. In some embodiments, 604 includes associating with a content item one or more retention-related objects and/or other metadata and/or associated methods configured and/or usable to implement an applicable retention policy with respect to the content item. At 606, retention policy services and/or logic are invoked as required to apply to each content item the retention policy or policies applicable to it. In some embodiments, 606 includes ensuring that a content system on which the content item is stored does not allow the content item to be moved, modified, or deleted, e.g., during an applicable retention period, and ensuring that deletion or other disposition as required and/or permitted by an applicable retention policy is performed, verified, and documented as and when required/permitted. In some embodiments, 606 is performed for each content item at least in part by a retainer object associated with the content item.

Figure 7:
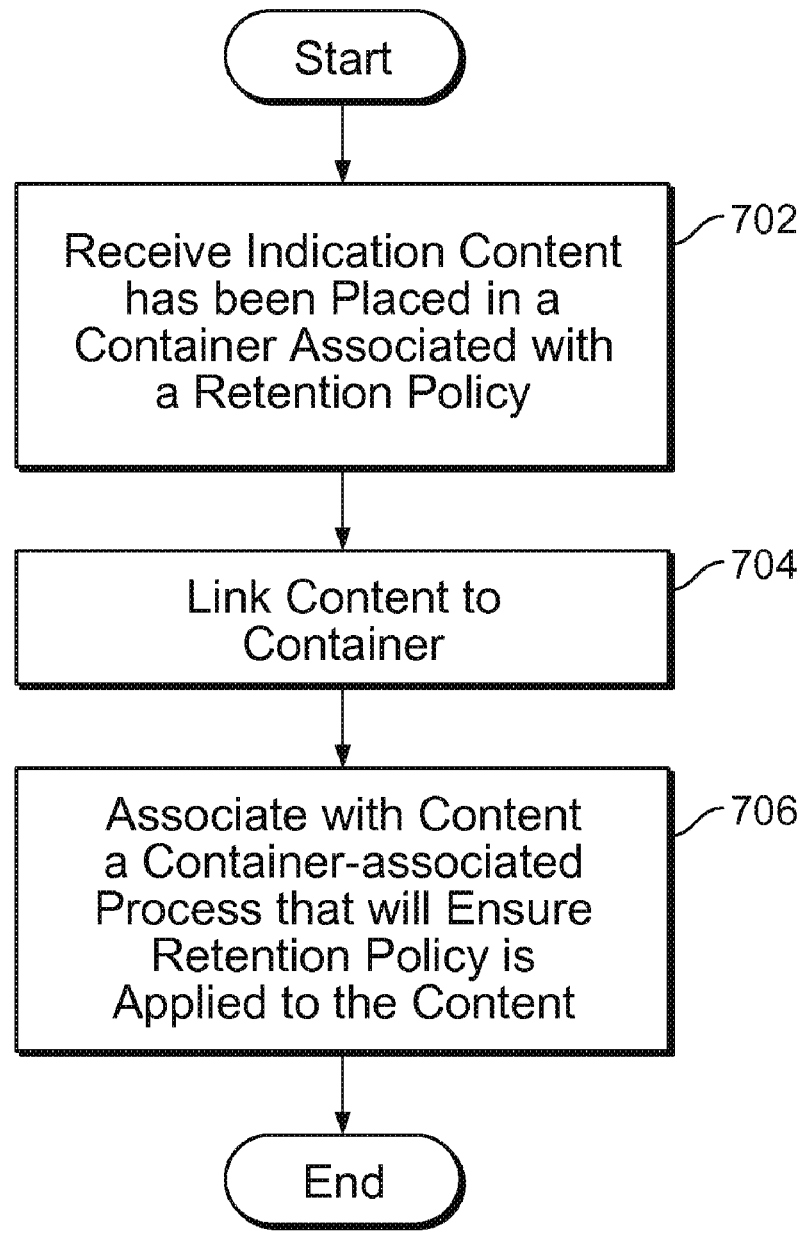
FIG. 7 is a flow chart illustrating an embodiment of a process for receiving and processing an indication that a retention policy is to be applied to an item of managed content.

FIG. 7 is a flow chart illustrating an embodiment of a process for receiving and processing an indication that a retention policy is to be applied to an item of managed content. In some embodiments, 602 of FIG. 6 includes the process of FIG. 7. In the example shown, at 702 an indication is received that one or more items of managed content have been placed in a logical or physical storage container or other logical or physical location associated with a retention policy. In some embodiments, 702 includes receiving an indication that an item of content has been associated by a user with a logical folder or container with which a retention policy is associated, e.g., by dragging an icon representing the content item as displayed via a user interface into an icon associated with the logical folder or other container. In some embodiments, a filter or other automated sorting or identification process may cause an item of managed content to be associated with a logical (and/or physical) storage location (e.g., a folder or other container) with which a retention policy is associated. At 704, the item(s) of managed content is/are linked to the container. In some embodiments, 704 includes updating a content or other object used to represent the managed content item in a set of metadata to include an attribute and/or other data that links the content item to the container. At 706, a container-associated process that will ensure the retention policy is applied to the item(s) of content is associated with each item of content placed in the container. In some embodiments, 706 includes associating with each item of content placed in the container a container-associated process, referred to in some embodiments as an "aspect", that extends the behavior of a content object and/or other object used to represent the content item in a set of metadata to include and/or invoke retention-related processing to be performed and/or initiated when the content item is "saved". In some embodiments, the retention-related processing includes instantiated (if needed) and linking to a document and/or other object associated with the content item to be retained a retainer object configured to implement the applicable retention policy with respect to the content item, see, e.g., 604 of FIG. 6.

Figure 8:
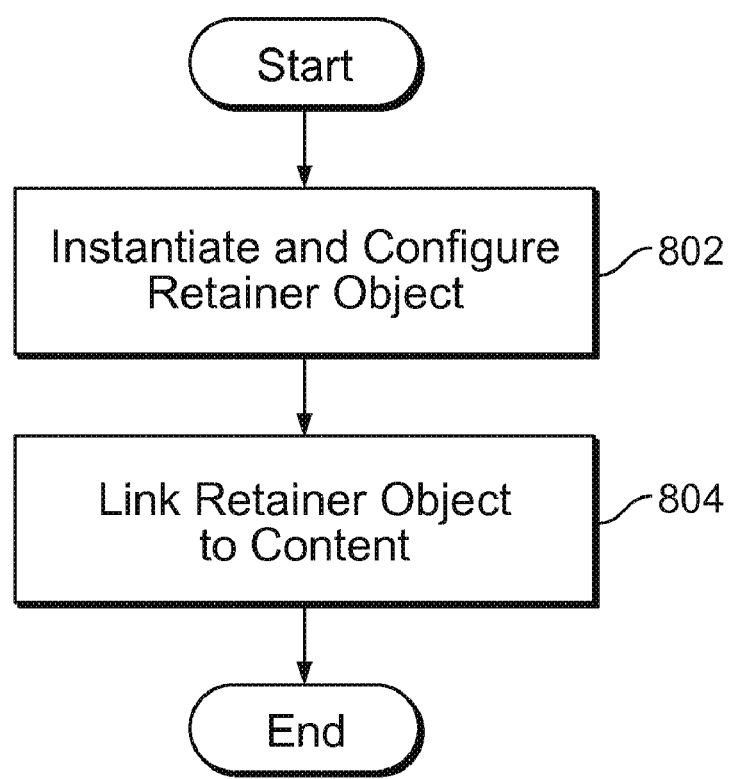
FIG. 8 is a flow chart illustrating an embodiment of a process for associating a retention policy with an item of managed content.

FIG. 8 is a flow chart illustrating an embodiment of a process for associating a retention policy with an item of managed content. In some embodiments, 604 of FIG. 6 includes the process of FIG. 8. In the example shown, at 802 a retainer object configured to implement the retention policy is instantiated and configured. In some embodiments, the retainer object includes retention policy data that determines at least in part the retention services and/or processing to be performed with respect to the content item(s) with which the retainer object is associated. In some embodiments, a single retainer object is instantiated and configured to provide retention with respect to a plurality of related content items (e.g., a complex or virtual document that includes more than one content item; or all items in a folder or other logical or physical location), and in such embodiments 802 is performed only once for the entire set of content to be governed by the one retainer object. In 804, the retainer object instantiated in 802 is linked to the item(s) of content to be governed by the retainer object. In some embodiments, 804 includes added to a document and/or content object with which the item of content is associated a retainer identifier data that links the retainer object to the content. In some embodiments, the process of FIG. 8 is invoked when an item of content to which a retention policy is to be applied is saved, e.g., the first time it is saved after being linked to a folder or other container with which the retention policy is associated.

Figure 9:
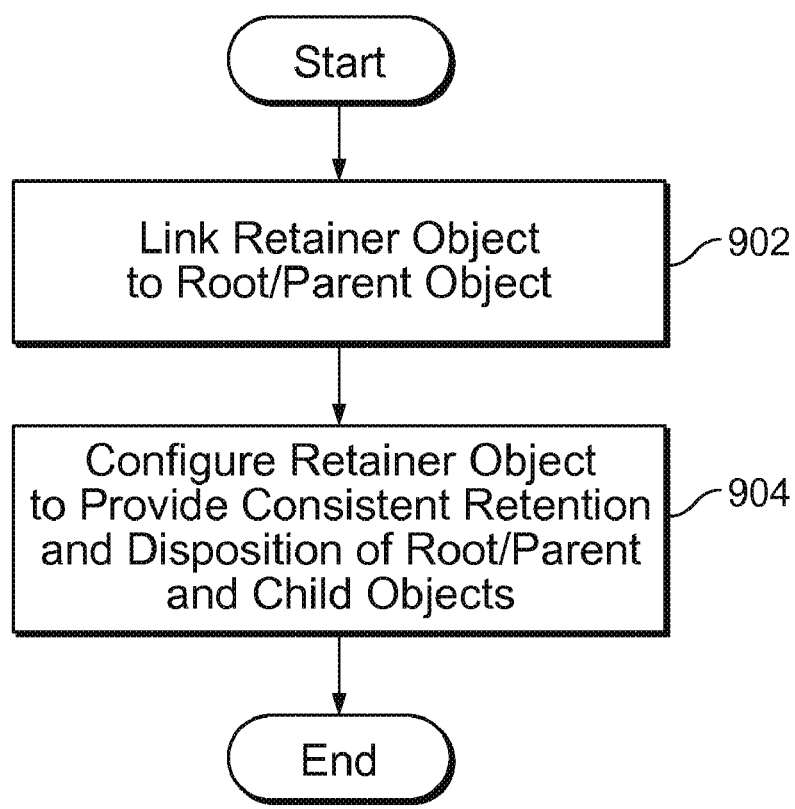
FIG. 9 is a flow chart illustrating an embodiment of a process for providing retention with respect to a complex document.

FIG. 9 is a flow chart illustrating an embodiment of a process for providing retention with respect to a complex document. As used herein, a complex document is one that comprises two or more items of content. In the example shown, at 902 a retainer object is linked to a root or parent object associated with a complex document. In some embodiments, 902 occurs when the complex document and/or one or more content items comprising the document is/are saved subsequent to an indication being received that a retention policy is to be applied to the complex document, e.g., the complex document and/or at least a root or parent object thereof has been placed by a user or a filtering/sorting process into a logical or physical container with which the retention policy is associated. At 904, the retainer object is configured, and/or a further retainer object is instantiated and configured, to provide consistent retention and disposition, in accordance with the retention policy, of the root/parent object and any child objects. In some embodiments, a retainer object is linked only to a root/parent object for a complex document and retention applied to the root/parent object is extended to any child object(s).

Figure 10:
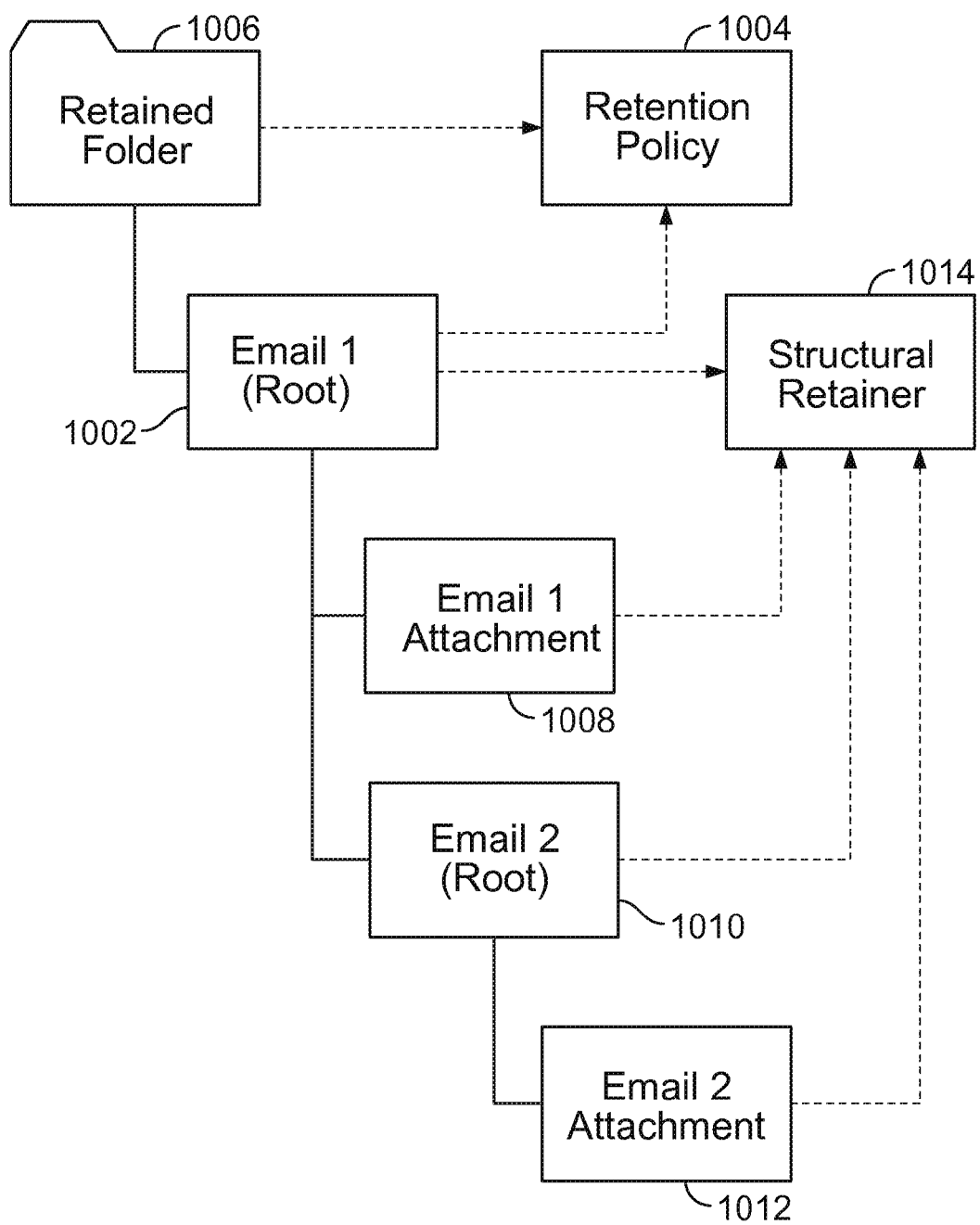
FIG. 10 is a block diagram illustrating a complex document to which a retention policy is to be applied.

FIG. 10 is a block diagram illustrating a complex document to which a retention policy is to be applied. In the example shown, an email message 1002 is subject to a retention policy 1004 by virtue of having been placed in (e.g., linked to) a logical retained folder 1006. The email message 1002 includes an attachment 1008 comprising an attached or embedded file, imaged, or other item and an attached email message 1010, such as a forwarded or otherwise attached or embedded message. The attached email message 1010 itself has an attachment 1012. In the example shown, consistent retention of the root/parent email message 1002 and child objects attachment 1008, attached email message 1010, and attachment 1012, is provided by instantiating and linking to each object a "structural" retainer 1014. The structure retainer 1014 ensures consistent retention in some embodiments by ensuring that consistent retention is applied to subsequently created/saved versions, for example, of the root/parent email message 1002 and its associated child objects 1008, 1010, and 1012. In some alternative embodiments, a retainer object is associated only with the root/parent object and the retainer object ensures consistent retention (and disposition) of child objects and metadata by learning from the root/parent object which objects, if any, are child objects of the root/parent.

Figure 11:
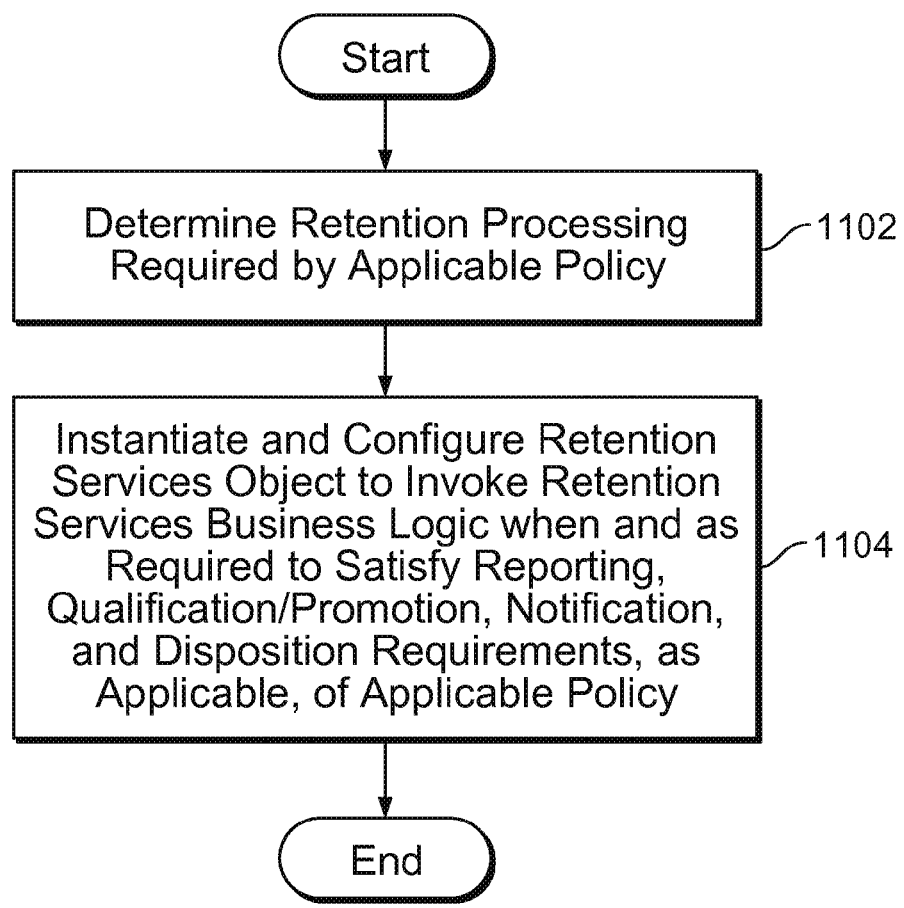
FIG. 11 is a flow chart illustrating an embodiment of a process for performing retention-related operations with respect to managed content.

FIG. 11 is a flow chart illustrating an embodiment of a process for performing retention-related operations with respect to managed content. At 1102, the retention processing required to be performed with respect to one or more items of managed content, e.g., as prescribed by a retention policy that has been associated with the content items, is determined. At 1104, a retention services object is instantiated and configured to invoke retention services business logic when and as required to implement and/or otherwise satisfy any reporting, qualification/promotion, notification, and/or disposition requirements imposed by the applicable retention policy or policies. In some embodiments, a retainer object associates content with a retention policy and ensure the content is retained, in the required manner/form and for a prescribed retention period, by a content system in which it is stored; and a retention services object implements other aspects of an applicable retention policy, such as by defining and executing a business process to qualify/promote the content through one or more phases of retention; generate reports and/or notifications as configured and/or required; generate and preserve required records of retention/disposition; and move, verifiably delete, or otherwise dispose of content through one or more phases of retention and final disposition.

Figure 12A:
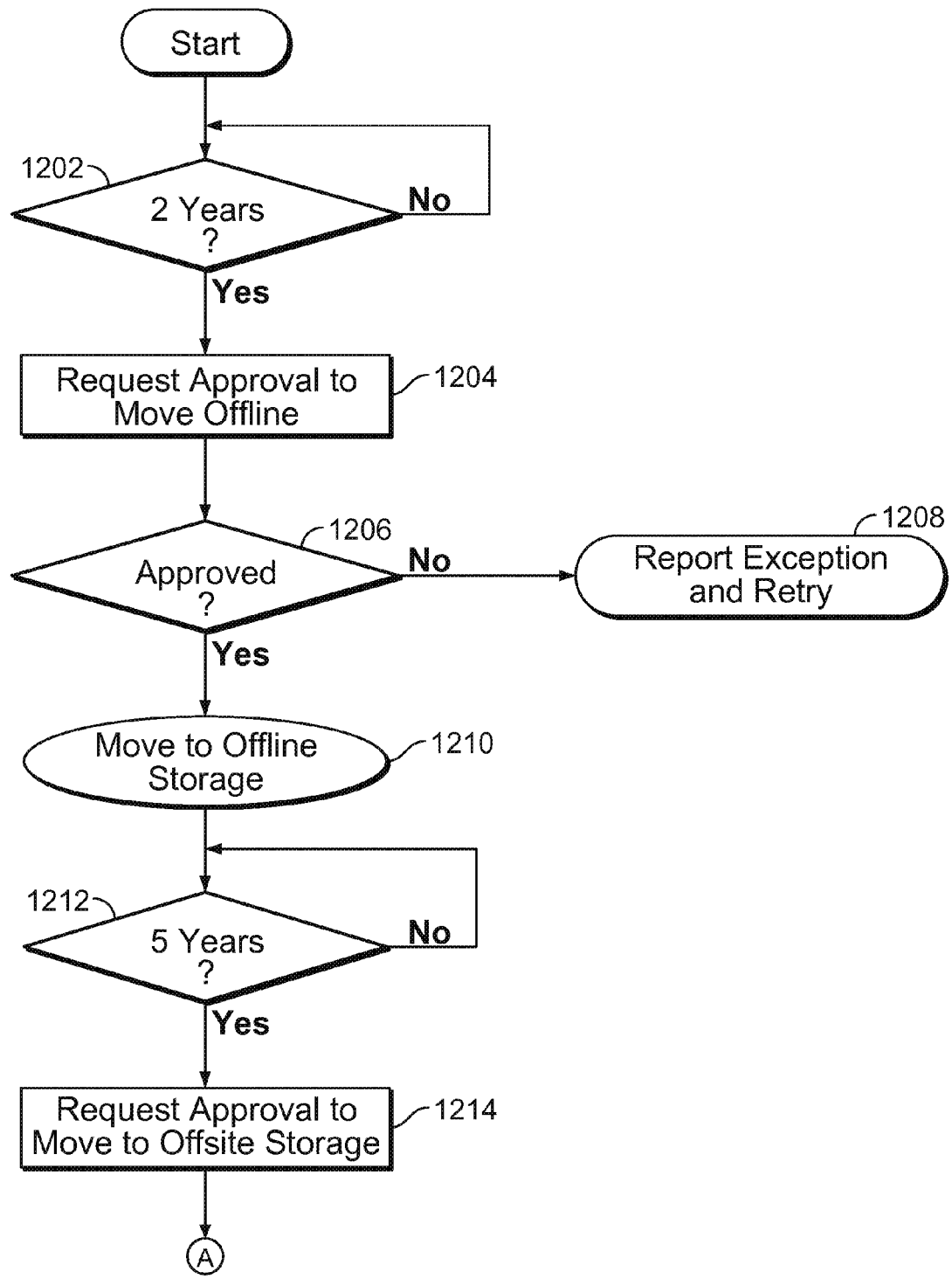
FIGS. 12A and 12B depict a flow chart illustrating an example of a retention policy and associated qualification, promotion, and disposition processes.
Figure 12B:
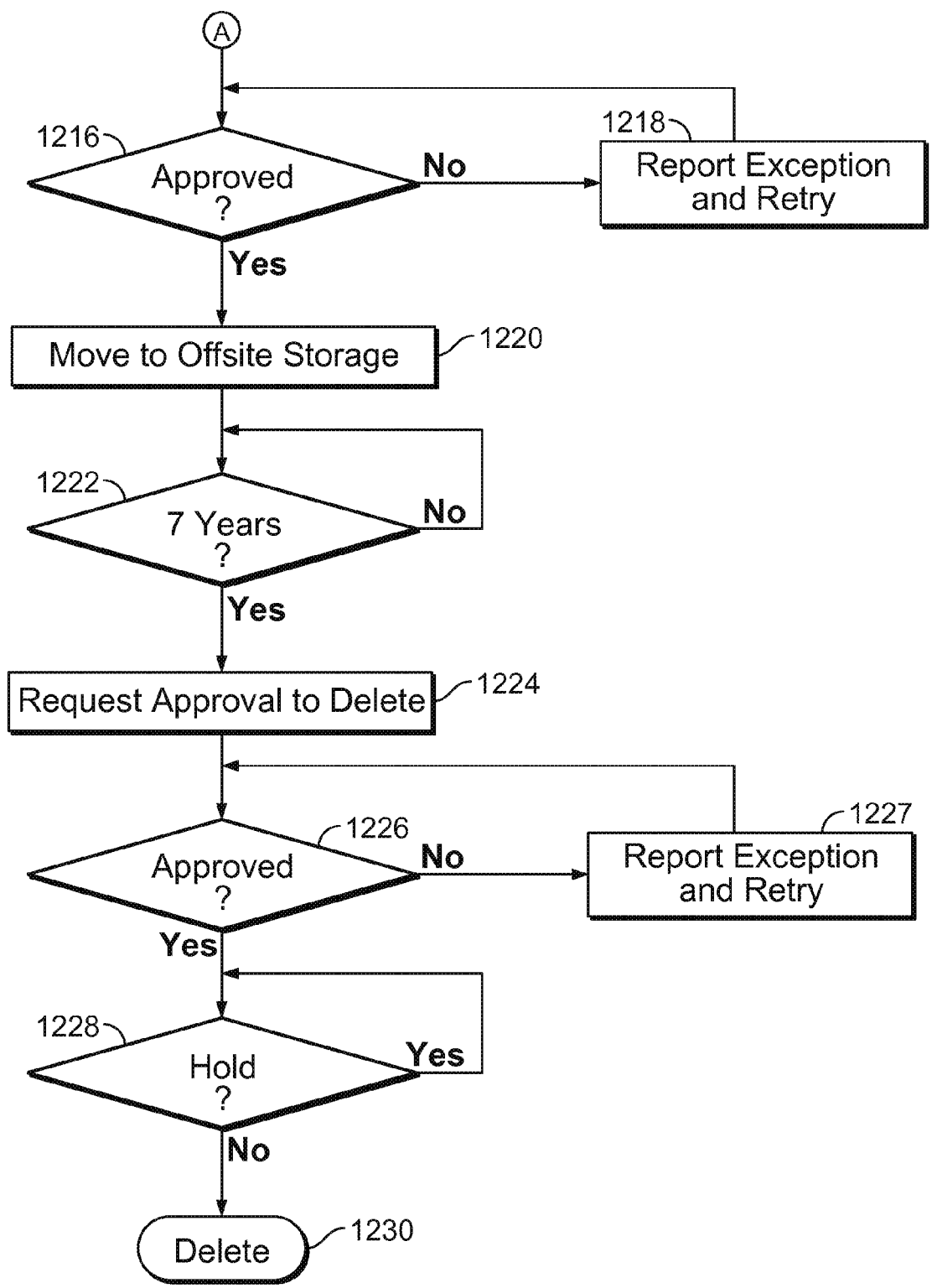

FIGS. 12A and 12B depict a flow chart illustrating an example of a retention policy and associated qualification, promotion, and disposition processes. In the example shown, content to which a retention policy with which the process of FIGS. 12A and 12B is associated requires that content be retained in near-line (e.g., relatively readily accessible) storage for two years, moved upon approval to offline (e.g., tape or other removable media) storage for another three years (e.g., until a date five years after the content was created, sent, and/or received), moved upon further (and possibly different) approval to offsite (e.g., tape or other removable media stored at a central and/or third party storage location) storage for another two years (i.e., for a total of seven years from creation/sending/receiving), and then verifiably deleted after receiving approval for deletion unless a legal, regulatory, investigation, or other "hold" has been placed on the content. In various embodiments, the process of FIGS. 12A and 12B is implemented by one or more retainer and/or retention services objects that have been associated with (e.g., linked to) one or more items of content to which an associated retention policy applies. At 1202, it is determined whether the initial two year retention phase has expired with respect to the content. In some embodiments, a retention services object schedules at the time retention begins an event to "wake up" the process of FIGS. 12A-12B with respect to an item of content (or a related set of content items, e.g., those comprising a complex document and/or those stored in a particular logical and/or physical storage location) when the initial two year retention phase has expired. Once the initial two year period has expired, at 1204 approval to move the content to offline storage (e.g., tape) is requested. The timing, source(s), order, and nature of approvals required are determined at least in part by the applicable retention policy. If the approvals required to move the content to offline storage are not received (e.g., within a required time), at 1208 an exception is reported (e.g., logged and/or included in a report generated and/or presented via an administrative interface) and in this example a "retry" is scheduled and performed later to attempt again to get the approvals. If approved (1206), the content is moved to offline storage (1210) and once offline storage of the content has been verified, the content management system and/or retention records and/or status information (e.g., associated metadata) are updated, as applicable, and the online (e.g., near-line) copy of the content is deleted. At 1212, it is determined whether the content has been retained for a total of five years (e.g., from creation, sending, and/or receiving as applicable). Once the content has been retained for a total of five years, at 1214 approval to move the content to offsite storage is requested. If it is determined at 1216 that moving the content to offsite storage has been approved, at 1218 an exception (i.e., departure from the retention policy) is reported and a further attempt to get approval is made later. If moving the content to offsite storage is approved, at 1220 the content is moved to offsite storage, e.g., by sending a tape or other media on which the content is stored to an offsite (e.g., central and/or third party) storage location. At 1222 it is determined whether the content has been retained for a total of seven years. If so, at 1224 approval to delete (or otherwise finally dispose of, depending on what the retention policy requires) the content is requested. If approval is not received (1226), at 1227 an exception is reported and a further attempt to obtain approval for deletion (or other final disposition) is made later. If deletion (or other final disposition) is approved (1226), at 1228 it is determined whether a "hold" has been placed on the content. If a "hold" has been placed on the content, the content is retained, in this case in offsite storage, until the hold is removed. If no "hold" has been placed and/or once any last remaining hold has been removed, at 1230 the content and any associated metadata is deleted, deletion is verified, and a record of the retention and final disposition of the content and associated metadata is generated and maintained. In some embodiments, a check for a hold as at 1230 is performed at each stage of qualification/promotion and content and associated metadata is not moved or changed in any way during "hold" periods, with the qualification, promotion, and/or disposition processes associated with a retention policy resuming once all holds have been removed.

Figure 13:
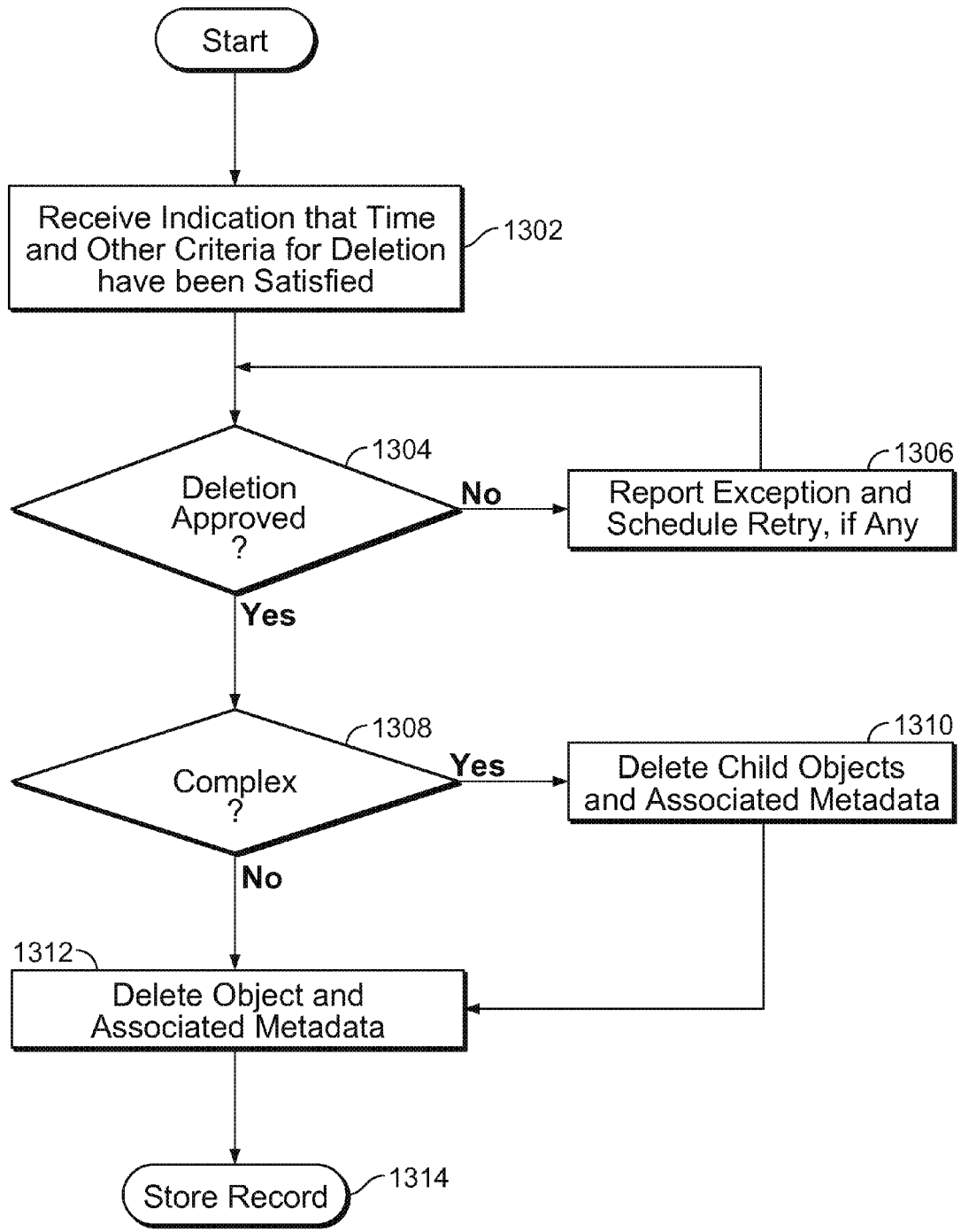
FIG. 13 is a flow chart illustrating an embodiment of a process for deleting content in accordance with a retention policy at the expiration of a retention period.

FIG. 13 is a flow chart illustrating an embodiment of a process for deleting content in accordance with a retention policy at the expiration of a retention period. In some embodiments, 1230 of FIG. 12 includes the process of FIG. 13. At 1302, an indication that time and/or other applicable criteria for deletion have been satisfied. In some embodiments, 1302 includes determining that an applicable retention period and/or a last retention phase of a multi-phase retention period has expired. In some embodiments, 1302 includes an event that "wakes up" a qualification, promotion, and disposition process with which the content is associated. At 1304 it is determined and/or confirmed/verified that any approval(s) required to be obtained, e.g., by a retention policy applicable to the content and/or otherwise, prior to deletion (or other final disposition) has/have been obtained. If not, in this example at 1306 an exception is noted and a retry attempt is scheduled. Once any required approval(s) has/have been obtained, or if no (further) approval is required, at 1308 it is determined whether the content comprises a complex document or content item. If so, at 1310 all child objects and any metadata associated with the child objects is deleted. Once child objects and their associated metadata, if any, have been deleted, or if the content item is not a complex document or object, at 1312 the parent/root object and associated metadata are deleted, after which a record of the deletion (or other final disposition) of the content and associated metadata is generated and stored (1314).

Figure 14:
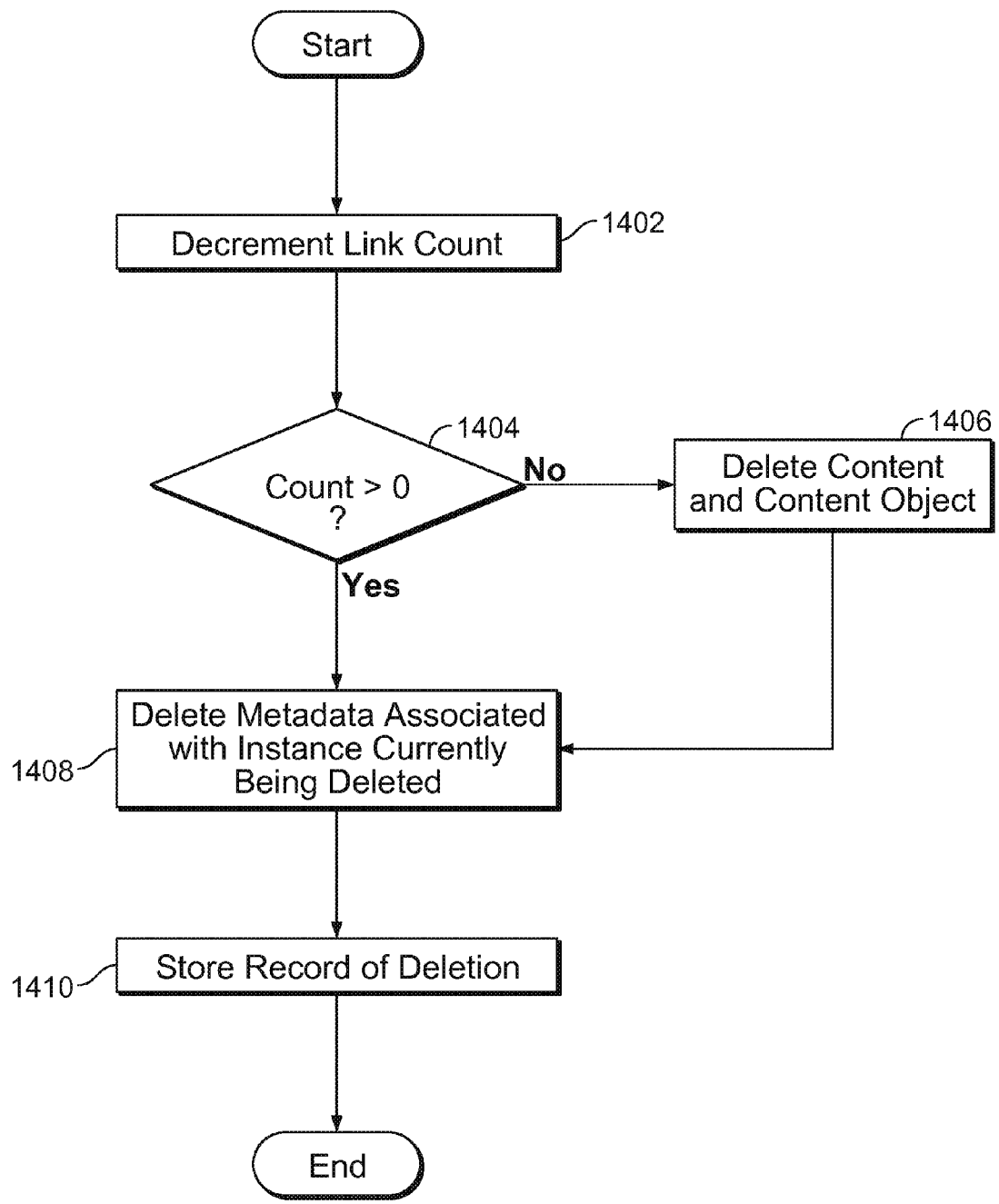
FIG. 14 is a flow chart illustrating an embodiment of a process for deleting content and associated metadata in an environment in which content may be associated with more than one document or other object.

FIG. 14 is a flow chart illustrating an embodiment of a process for deleting content and associated metadata in an environment in which content may be associated with more than one document or other object. In some embodiments, the process of FIG. 14 is used to implement 1310 and 1312 of FIG. 13. At 1402, upon receiving an indication that an item of content is eligible to be deleted under an applicable retention policy, a link count associating with a content object or other object that represents the content item in a set of metadata is decremented. In 1404, it is determined whether the link count decremented at 1404 is greater than zero. If not, in some embodiments that would indicate that the content is not linked to any document or object other than the document or object that is now subject to deletion, and in 1406 the content item and the associated content object are deleted. If the count is greater than zero, e.g., because one or more documents/objects not yet eligible for deletion are linked to it, or after the content and content object have been deleted at 1406, at 1408 any metadata (e.g., a document object) associated with the instance of the content that is currently being deleted is deleted. At 1410, the deletion of any data that has been deleted is verified and a record of the retention and disposition of the content is generated and/or updated and stored and/or maintained, after which the process of FIG. 14 ends.

Figure 15:
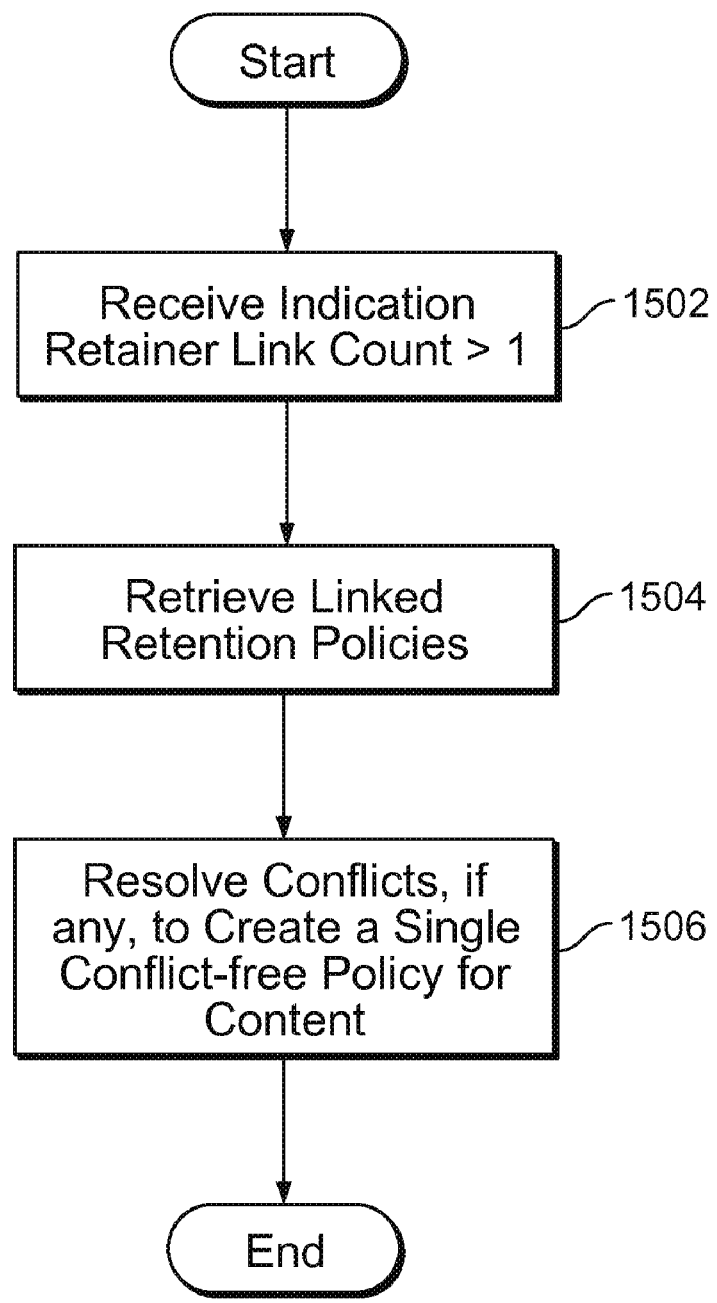
FIG. 15 is a flow chart illustrating an embodiment of a process for applying two or more retention policies to the same content.

FIG. 15 is a flow chart illustrating an embodiment of a process for applying two or more retention policies to the same content. In 1502, an indication is received that a retainer link count is greater than one. In this example, a retainer link count greater than one indicates that two or more retainer objects have been linked to an object associated with an item of content, e.g., an object that represents the item of content in a set of metadata and/or an object with which the content is otherwise linked and/or associated. In some alternative embodiments, 1502 includes determining through another mechanism that two or more retention policies apply to an item of content. At 1504, the retention policies applicable to the content are retrieved. At 1506, any conflicting requirements are identified and the conflicts, if any, resolved to create a single, conflict-free policy which is then associated with and applied to the content.

Figure 16:
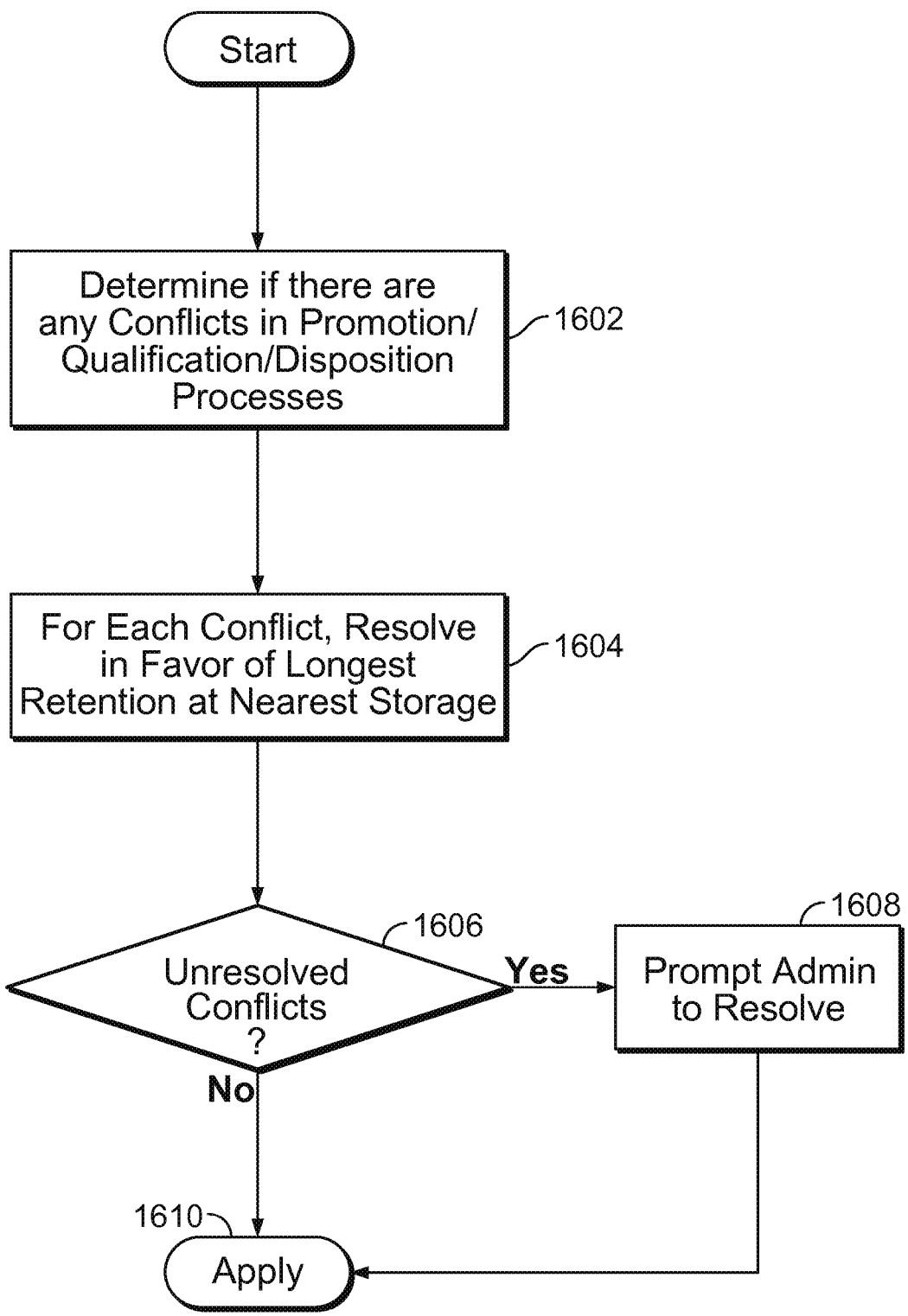
FIG. 16 is a flow chart illustrating an embodiment of a process for identifying and resolving conflicts between/among two or more retention policies applicable to an item of content.

FIG. 16 is a flow chart illustrating an embodiment of a process for identifying and resolving conflicts between/among two or more retention policies applicable to an item of content. In some embodiments, 1506 of FIG. 15 includes the process of FIG. 16. At 1602, it is determined whether there are any conflicts in the qualification, promotion, disposition, or other requirements of the applicable retention policies. At 1604, for each conflict, if any, the conflict is resolved if applicable and possible in favor of the longer/longest retention at the nearer/nearest (most readily accesses) storage type/location. For example, if a first policy required near-line storage for two years followed by offline but onsite storage for five more years, and deletion thereafter, and a second policy required near-line storage for three years followed by offsite storage for seven more years prior to deletion, in some embodiments at 1604 the conflicting provisions would be resolved as follows: near-line storage for three years, followed by offline (but not offsite) storage for four more years (to satisfy the requirement of the first policy that the content not move offsite until after a total of seven years), followed by offsite storage for three years (to satisfy the requirement of the second policy that the content be retained at least offsite for a total of ten years) and deletion thereafter. In some embodiments, approvals if any are obtained as prescribed by each applicable retention policy as and when required by the policy imposing the requirement, even if doing so results in approvals being obtained prior to moving and/or deleting the content. In other embodiments, approval timeframes are adjusted so that the approvals required prior to moving or deleting content are obtained at or near the time the content is to be moved or deleted under the merged retention policy. At 1606, it is determined whether any conflict(s) remain(s) unresolved after application of the algorithm/rule applied at 1604. If so, at 1608 an administrator is prompted to resolve any remaining conflicts. If all conflicts are resolved by the processing performed at 1604 or once any remaining conflicts have been resolved at 1608, at 1610 the merged, conflict-free retention policy is applied to the content.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing content, comprising:
   receiving an indication that a first stored object linked to a content object in a metadata store and associated with an item of content in a content store comprising a body of managed content is no longer subject to retention based on the expiration of a first retention policy associated with the first stored object;
   wherein the first retention policy in part ensures the item of content required to be retained is not disposed before the expiration of the first retention policy;
   using a processor to decrement a link count associated with the content object;
   in the event that the link count is greater than zero:
   determining that the item of content is associated with at least a second stored object associated with a second retention policy and linked to the content object;
   deleting or otherwise disposing of the first stored object; and
   retaining the content object in the metadata store and the item of content in the content store based at least in part on the second retention policy; and
   in the event that the link count is not greater than zero, deleting or otherwise disposing of the content object in the metadata store, the item of content in the content store, and the first stored object.

2. A method as recited in claim 1, further including incrementing the link count associated with the item of content each time a new stored object becomes associated with the item of content.

3. A method as recited in claim 1, wherein the link count is stored in the content object associated with the item of content.

4. A method as recited in claim 1, wherein a stored object is a document object stored in the metadata store.

5. A content management system, comprising:
   a processor configured to:
   receive an indication that a first stored object linked to a content object in a metadata store and associated with an item of content in a content store comprising a body of managed content is no longer subject to retention based on the expiration of a under first retention policy associated with the first stored object;
   wherein the first retention policy in part ensures the item of content required to be retained is not disposed before the expiration of the first retention policy;
   decrement a link count associated with the content object;
   in the event that the link count is greater than zero:
   determine that the item of content is associated with at least a second stored object associated with a second retention policy and linked to the content object;
   delete or otherwise dispose of the first stored object; and
   retain the content object in the metadata store and the item of content in the content store based at least in part on the second retention policy; and in the event that the link count is not greater than zero, delete or otherwise disposing of the content object in the metadata store, the item of content in the content store, and the first stored object; and
   a memory coupled to the processor and configured to provide instructions to the processor.

6. A system as recited in claim 5, wherein the processor is further configured to increment the link count associated with the item of content each time a new stored object becomes associated with the item of content.

7. A system as recited in claim 5, wherein the link count is stored in the content object associated with the item of content.

8. A system as recited in claim 5, wherein a stored object is a document object stored in the metadata store.

9. A computer program product for managing content, the computer program product being embodied in a computer readable storage medium and comprising computer instructions for:
   receiving an indication that a first stored object linked to a content object in a metadata store and associated with an item of content in a content store comprising a body of managed content is no longer subject to retention based on the expiration of a first retention policy associated with the first stored object;
   wherein the first retention policy in part ensures the item of content required to be retained is not disposed before the expiration of the first retention policy;
   using a processor to decrement a link count associated with the content object;
   in the event that the link count is greater than zero:
   determining that the item of content is associated with at least a second stored object associated with a second retention policy and linked to the content object;
   deleting or otherwise disposing of the first stored object; and
   retaining the content object in the metadata store and the item of content in the content store based at least in part on the second retention policy; and
   in the event that the link count is not greater than zero, deleting or otherwise disposing of the content object in the metadata store, the item of content in the content store, and the first stored object.

10. A computer program product as recited in claim 9, further comprising computer instructions for incrementing the link count associated with the item of content each time a new stored object becomes associated with the item of content.

11. A computer program product as recited in claim 9, wherein the link count is stored in the content object associated with the item of content.

12. A computer program product as recited in claim 9, wherein a stored object is a document object stored in the metadata store.

* * * * *